United States Patent [19]

Hanser

[11] 4,061,309
[45] Dec. 6, 1977

[54] VEHICLE LEVELING SYSTEM AND DEVICE THEREFOR

[75] Inventor: Paul Edmond Hanser, Moline, Ill.

[73] Assignee: HWH Corporation, Rock Island, Ill.

[21] Appl. No.: 744,240

[22] Filed: Nov. 23, 1976

[51] Int. Cl. .............................................. B66f 3/24
[52] U.S. Cl. .............................................. 254/86 H
[58] Field of Search ............... 254/45, 86 H; 280/764, 280/765

[56] References Cited

U.S. PATENT DOCUMENTS

| | | | |
|---|---|---|---|
| 2,442,881 | 6/1948 | Soskin | 254/86 H |
| 2,546,203 | 3/1951 | Tucker | 254/86 H |

FOREIGN PATENT DOCUMENTS

| | | | |
|---|---|---|---|
| 729,257 | 4/1932 | France | 254/86 H |
| 625,003 | 4/1927 | France | 254/86 H |

Primary Examiner—Robert C. Watson
Attorney, Agent, or Firm—Thomas E. Frantz

[57] ABSTRACT

A vehicle leveling system utilizing a plurality of support assemblies mounted on the bottom of the vehicle for rotative movement between an upper storage position and a lower operating position. Each support assembly includes two hydraulically extendable plungers which are operated in automatic sequence, the first plunger extending to rotate the support assembly into a vertical operating position and the second plunger then extending into engagement with the ground. Retraction of the plungers and return of the support assembly to its upper storage position are accomplished by spring means. The support assembly also includes structure which will respond automatically to excessive internal pressure to permit its rotation without damage either to the system or vehicle should the vehicle be moved inadvertently while the second plunger is in engagement with the ground.

19 Claims, 8 Drawing Figures

FIG. 4

VEHICLE LEVELING SYSTEM AND DEVICE THEREFOR

BACKGROUND OF THE INVENTION

1. Field of the Invention

The present invention relates generally to the support of vehicles, and more particularly to a system of leveling and supporting trailers, campers, trucks and similar vehicles in a level position while parked on uneven or sloping terrain.

2. Description of the Prior Art

It has been proposed in the past to provide various types of systems and devices for use in leveling and supporting vehicles on uneven or sloping terrain. Such systems have included hydraulic jacks which are mounted on the bottom of the vehicle and which are pivoted to swing from a horizontal storage position to a vertical operating position prior to use. U.S. Pat. No. 3,362,683, for example, shows an assembly having linkage which swings the jack down as the piston or ram extends.

Certain problems have been experienced with such arrangements. Should the space below the vehicle be quite limited, the piston or ram may not be able to extend sufficiently to rotate the jack into proper operating position before contacting the ground. Also, if the jacks are not locked or stabilized in proper operating position, there is danger of inadvertent shifting of the vehicle as by a high wind, movement of persons therein, or the like. Yet in the usual system, any locking of jacks in operating position represents an invitation for damage either to the vehicle or support system in the event the vehicle should be moved accidentally or the operator forget to retract the jacks.

U.S. Pat. No. 3,817,493 illustrates one manner of releasably locking a jack in a vertical operating position without danger to either the jack or vehicle should the vehicle be moved accidentally. However, as the structure taught in this patent still utilizes extension of the ram or piston to mechanically swing the jack into operating position, it does not solve the problem of limited space below the vehicle. Also, its linkage mechanism is susceptible to certain problems of possible malfunction should ice or dirt build up thereon or around the foot.

SUMMARY OF THE INVENTION

In view of the above, it is a principal object of this invention to provide an improved leveling system for vehicles.

It is another object of this invention to provide an improved leveling device for use in a vehicle leveling and support system.

It is yet another object of the present invention to provide a rotatable support assembly in which the support plunger or ram remains retracted until the assembly is rotated to its operating position.

A still further object of this invention is the provision of a support assembly having two extendable plungers which are operated in sequence, one rotating the assembly to and holding the assembly in its operating position, and the other then extending into engagement with the ground.

Yet a further object of this invention is to provide a leveling system having a plurality of hydraulically operated support assemblies, each such assembly including two cylinders which are automatically operated in sequence to first lower the assembly and then extend the support plunger or ram.

Yet a still additional object of this invention is the provision of a support assembly having two hydraulic cylinders, one of the cylinders being connected to a fluid source and provided with structure which not only extends the assembly to and holds the assembly in its operating position but restricts entry of fluid into the second cylinder until after the assembly has been fully rotated.

An additional objective of this invention is to provide a vehicle leveling device including a rotatable support assembly having a first plunger which is operable both to extend the assembly to an operating position and to provide an overload release which permits the assembly to rotate without damage should the vehicle accidentally be moved prior to retraction of a second support plunger.

More specifically, this invention contemplates the provision of a system for and a leveling device useful in leveling and supporting a parked vehicle. The system includes a plurality (preferably four) of the devices secured at spaced locations on the bottom of the vehicle. The devices include pivotally mounted support assemblies generally held by springs in an upper "out of the way" storage position adjacent the bottom of the vehicle. After parking, the vehicle's operator may wish to stabilize it against swaying or movement, or he may wish to bring it to a level position if parked on sloping or uneven terrain. In any such event, the leveling system is operated from a central control assembly mounted in or on the vehicle and provided with a separate control or valve for independently operating each leveling device.

The central control automatically activates a power generator (i.e., hydraulic pump or compressor) upon initial manipulation of any of the individual controls. Thereafter, further manipulation of the controls will result in operation of the leveling devices, such devices preferably being activated one at a time starting with the one at the lowest corner of the vehicle and then progressing to the one at the next lowest corner. In this manner, the vehicle usually can be leveled using only two or three of the leveling devices. Should all four be used, of course, all wheels of the vehicle could be raised from the ground, and this might result in a relatively dangerous condition conducive to inadvertent and unexpected shifting of the vehicle.

The power medium employed in the system may be compressed gas, air or other suitable substance, but hydraulic fluid is preferred. Regardless of the medium employed, however, each leveling device includes a rotatably mounted supported assembly having two power units or cylinders from which two plungers are sequentially extendable in generally opposite directions. The first of the cylinders is disposed "off-center" with respect to the pivot point around which the support assembly rotates. The power medium is delivered initially to this cylinder to extend the plunger mounted therein. As this plunger extends it engages a fixed stop means or member, and such engagement causes the cylinder to swing around the pivot point and thus to rotate the complete support assembly downwardly to a generally vertical position.

The other or second cylinder is substantially axially aligned with the above mentioned pivot point. This cylinder does not communicate directly with the power generator, but rather medium is delivered thereto only from the first cylinder and only after the support assembly has reached its lower operating position.

The first cylinder includes structure for isolating the second cylinder from the power generator until after the plunger of the first cylinder has been extended. This structure responds automatically to extension of the plunger to open a bypass through which medium passes into the second cylinder to project the plunger mounted therein into engagement with the ground. It will be seen, therefore, that the plunger of the second cylinder remains retracted until completely rotated into position for extension toward the ground. Accordingly, rotation of the support assembly requires a minimum of space under the vehicle.

Should the vehicle inadvertently or accidentally be moved while the support assemblies are engaged with the ground, no damage will occur either to the assemblies or the vehicle. If the vehicle is moved in one direction the support assemblies will simply rotate beyond their vertical operating position. In this connection, the plunger of the first cylinder preferably is not connected to the stop means against which it pushes during extension. Therefore, it is free to move away from this stop to permit rotation of the assemblies beyond their extended position in contravention to the biasing action of the return springs.

If the vehicle is moved in the other direction, however, the plungers of the first cylinders are forced upwardly against the previously mentioned stop means. Severe damage thus could occur either to the vehicle or the support assemblies if such force should not be relieved. To prevent any such damage, the previously mentioned bypass is opened automatically by the development in the cylinders of pressure greater than that necessary for their operation. Fluid of course will then flow through the open bypass to permit inward movement of the plunger and rotation of the support assembly. Thus, whether inadvertent vehicle movement occurs in a forward or rearward direction, the support assemblies and vehicle are protected against damage.

DESCRIPTION OF THE PREFERRED EMBODIMENT

Figure 1:
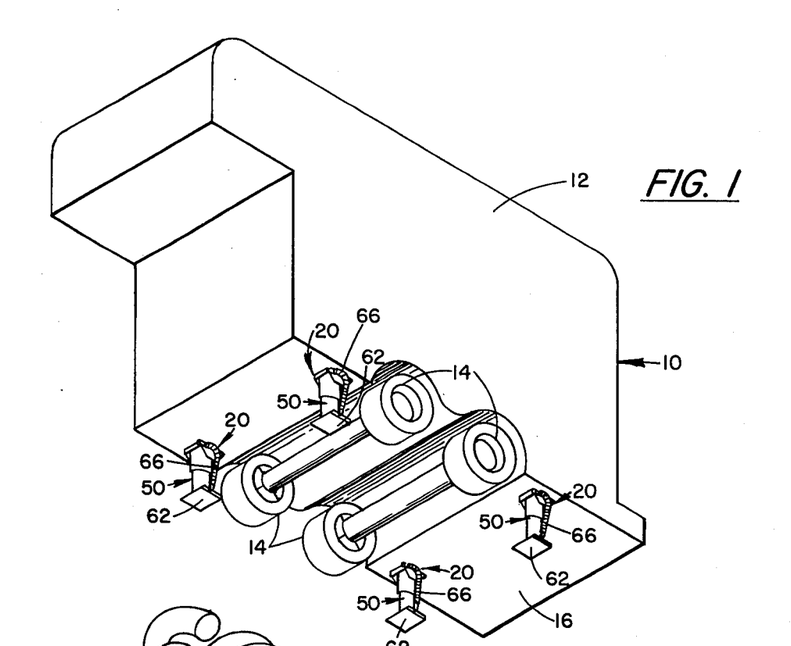
FIG. 1 is a bottom perspective view of a trailer in which a plurality of leveling devices according to the present invention are shown in a lower operating position.

Referring now to the drawings, there is shown in FIG. 1 a trailer 10 including an enclosed house portion 12 supported by two sets of wheel-axle assemblies 14.

As will be apparent from both the preceding and following description, the present invention is not limited as to use with the type of trailer illustrated, but may be employed with various other types of trailers and vehicles, such as campers, motorized homes, trucks, vans, and the like. Thus, it should be understood that the illustrated trailer is shown for purposes of convenience only and is not to be taken as limiting the invention.

Mounted on the bottom surface or portion 16 of trailer 10 are a plurality of leveling devices 20. Preferably four such devices are used with a trailer of the type illustrated, one adjacent each corner. Depending upon the type of vehicle, its weight distribution, intended use, etc., however, it will be obvious that a different number of or a different mounting pattern for the devices 20 may be selected.

Calling attention particularly to FIGS. 2 - 5, it will be seen that the leveling device 20 includes a mounting bracket 22 which may be secured in any convenient manner as by bolts, rivets, welding, etc., to the bottom portion 16 of the vehicle 10. Bracket 22 preferably is formed of a relatively substantial steel plate material, with the one piece top and back portion 24 and 26 being welded or otherwise permanently and securely affixed to the spaced, parallel side plates 28. In mounting this bracket, the top portion 24 should be disposed against the bottom 16 of the vehicle, with the open side 30 (FIG. 2) facing in the direction in which the support assembly 40 is to retract.

The support assembly 40 includes a first power unit or cylinder 42 mounted on a larger second power unit or cylinder 44. The cylinders are disposed parallel to one another and held together by a pair of encircling bands 46. As will be noted particularly from FIG. 5, the first cylinder 42 is mounted on the second cylinder at approximately a 3 o'clock position when viewed in cross section, the purpose of this angular mounting being to best utilize the space provided at the upper corner of the mounting bracket 22.

While the cylinders 42 and 44 are shown and described herein as comprising two assembled individual units, it will be understood that they readily may be secured together permanently as by welding or other means, or they may be formed integrally as a single cast or extruded piece. Thus, it should be understood that as used in this application, such terms as power units, cylinders, hydraulic cylinders, etc., are not to be construed as limited to an assemblage of two separable components. Mounting nuts 48 (FIG. 4) are welded or otherwise affixed to diametrically opposed sides of the second cylinder 44 adjacent its closed end 50. These nuts are aligned with holes (not shown) in side plates 28 of bracket 22, and are adapted to threadedly receive a pair of pivot bolts 52 which extend through such holes. Pivot bolts 52 thus form a pivot point or means for pivoting or rotating the support assembly 40 relative to the mounting bracket 22 and trailer 10.

Figure 2:
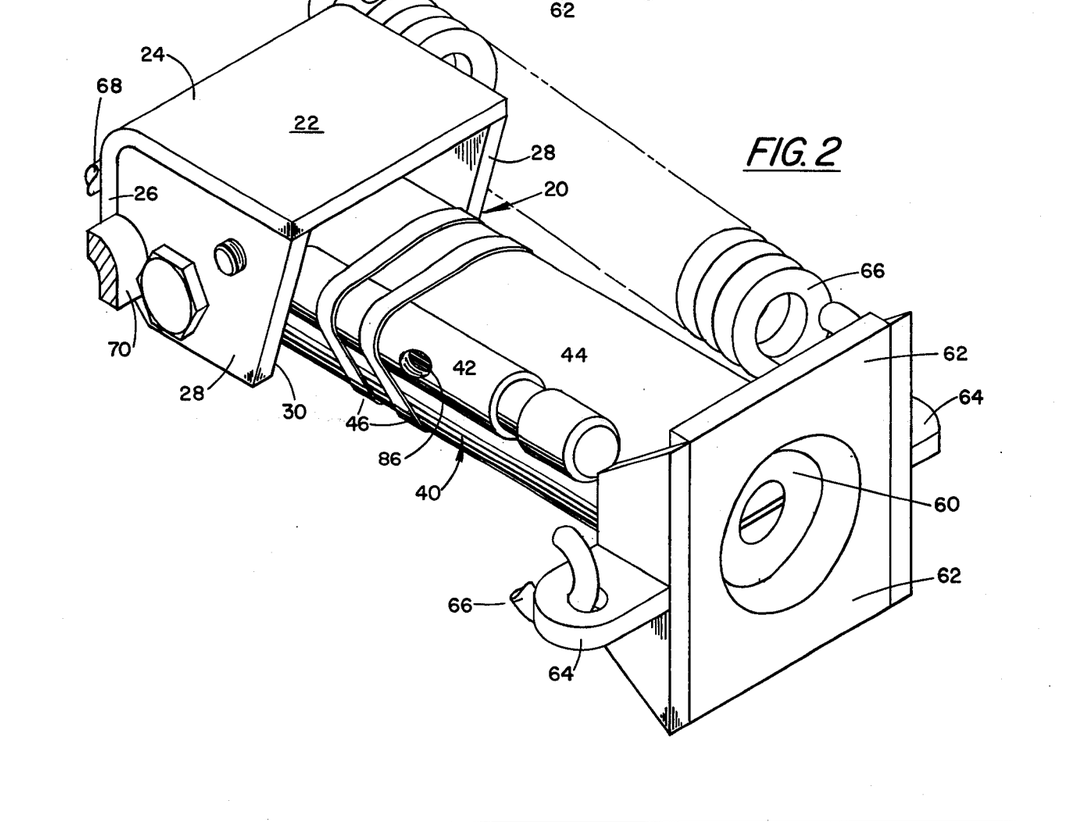
FIG. 2 is a perspective view of one of the leveling devices as illustrated in FIG. 1.
Figure 3:
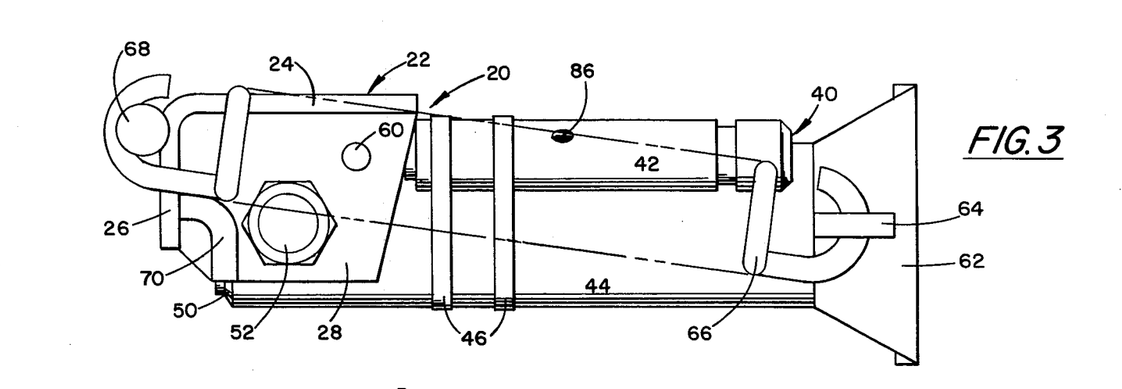
FIG. 3 is a side plan view of the leveling device shown in FIG. 2.
Figure 4:
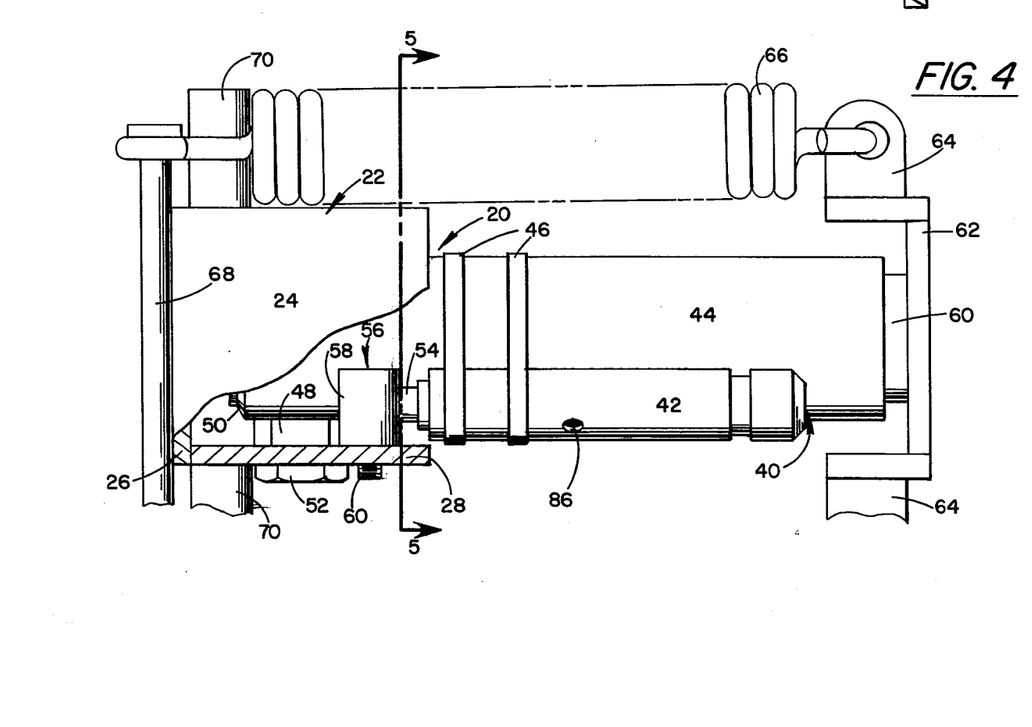
FIG. 4 is a top plan view of the leveling device shown in FIG. 2, with a portion of the mounting bracket broken away to better illustrate certain structural details.
Figure 5:
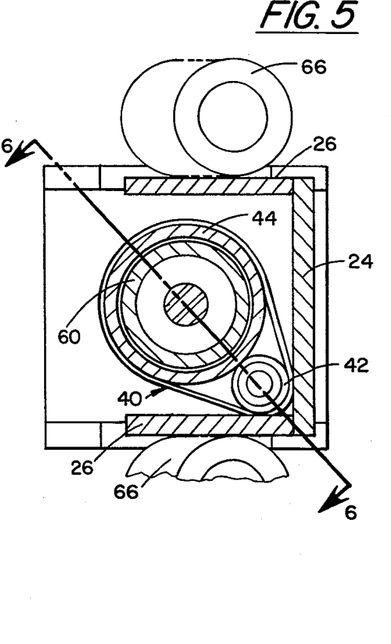
FIG. 5 is a cross sectional view as taken on the line 5—5 of FIG. 4.

First cylinder 42 includes a first plunger 54, the outer end of which is positioned to engage stop means 56 (FIG. 4), comprising a cylindrical roller 58 rotatable on a bolt or shaft 60. The bolt 60 is threaded or otherwise secured to side plate 28, with the roller 58 spaced above and forwardly of pivots 52 in such position that its cylindrical surface will continuously engage plunger 54 throughout its travel. Thus, assuming the support assembly 40 to be in an upper storage position as shown in FIGS. 2 - 4, as the plunger 54 is extended from cylinder 42, its outer end will react against roller 58. Such reaction will cause support assembly 40 to rotate around pivots 52 while the outer end of the plunger 54 rotates around roller 58. As will be well understood by those in the art, of course, the travel of plunger 54 relative to cylinder 42 is to be limited to the amount of extension necessary to rotate the assembly 40 into a substantially vertical operating position as illustrated in FIG. 1.

The second cylinder 44 includes a second plunger 60 substantially radially aligned with and positioned to extend outwardly from pivots 52. Attached to the outer end of plunger 60 is a foot or pad 62 which serves to provide a relatively large flat surface for contact with the ground. A pair of spring retaining ears 64 extend outwardly from diametrically opposed sides of foot 62 and are adapted to receive one end of tensioned coil springs 66. At their other end the springs 66 are hooked over a rod 68 which is welded or otherwise secured to the back 26 of bracket 22. As will be noted, rod 68 is disposed above pivots 52 whereby the springs will constantly exert force on the foot 62 and hence on the entire support assembly 40 in an upward direction.

Mounted on side plates 28 are spring guides 70 which curve outwardly and downwardly relative to pivots 52. As support assembly 40 is rotated from its upper to its lower position, springs 66 distend over guides 70 as best illustrated in FIG. 1 to shift their direction or angle of pull forwardly of the pivots. Thus, springs 66 constantly bias the support assembly 40 toward its retracted storage position even after its rotation into a vertical operating position.

Figure 6:
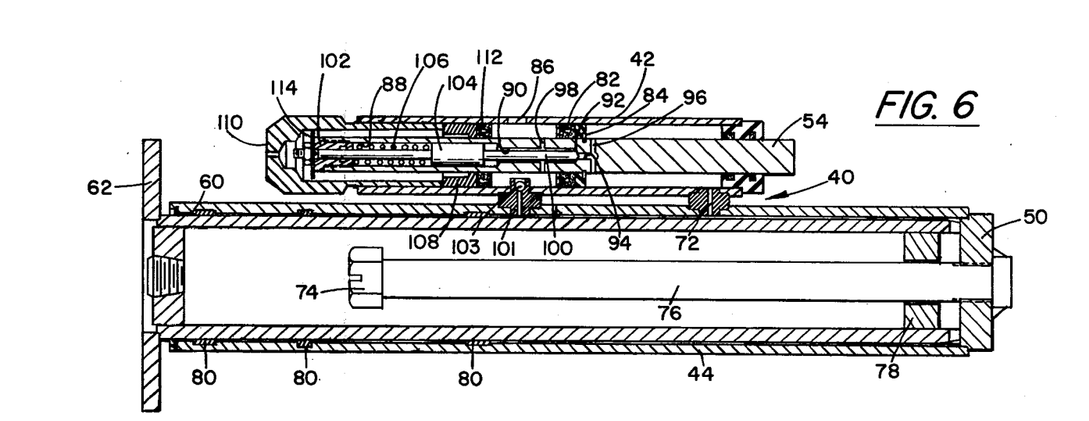
FIG. 6 is a longitudinal sectional view of the support assembly portion of the device as taken on the line 6—6 of FIG. 5.

As best shown in FIG. 6, the second cylinder and plunger assembly 44 – 60 is a single acting hydraulic type, of generally conventional construction and operation. The plunger 60 is extended upon introduction of a suitable hydraulic fluid through passage 72, such extension being limited by abutment between the enlarged head 74 of fixed guide pin 76 and the forward surface of stop collar 78 carried by plunger 60. Suitable seals 80 are disposed between the interior wall of cylinder 44 and plunger 60 to prevent leakage of fluid to the atmosphere.

For reasons to be described in further detail herebelow, plunger 60 remains in the retracted position illustrated best in FIG. 6 during rotation of support assembly 40 between its upper storage position and its lower operating position. Only after assembly 40 has been rotated to its lower position will fluid be permitted to enter cylinder 44 for purposes of extending plunger 60 in contravention to the biasing action of springs 66. Accordingly, the space necessary under vehicle 10 for proper rotation of the support assembly 40 is reduced to a minimum.

Figure 7:
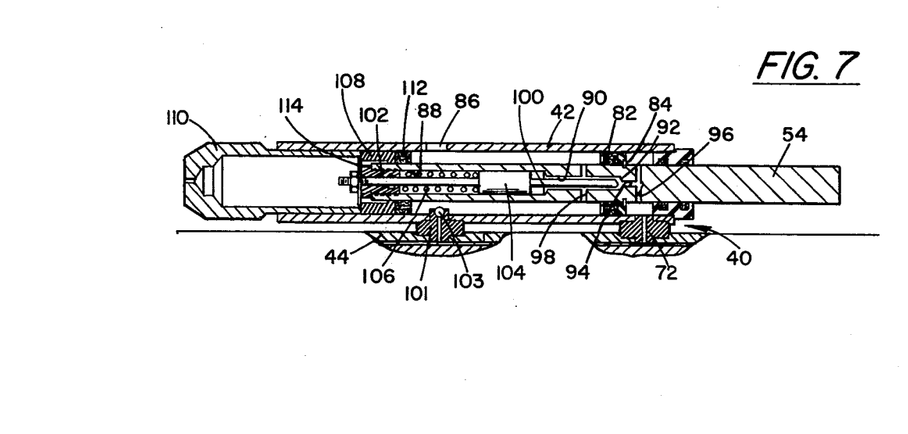
FIG. 7 is a partial longitudinal sectional view similar to that of FIG. 6 except showing the first plunger extended.

As will be clear from the preceding description, the first cylinder 42 and second cylinder 44 are operated sequentially, the plunger 60 of the second cylinder 44 remaining retracted until the plunger 54 of first cylinder 42 has been fully extended. This sequential operation is afforded by the structure provided in the first cylinder 42, as best illustrated in FIGS. 6 and 7.

Referring particularly to FIG. 6, plunger 54 is therein shown as being fully retracted. The plunger 54, it will be noted, comprises a relatively long rod having a seal member 82 suitably fixed thereon by a snap ring 84 or other similar anchoring device. This seal member 82 is disposed approximately at the mid-point of the length of the plunger 54 and slidingly and sealingly engages the interior wall of first cylinder 42. The seal member 82, therefore, forms a piston against which pressure is exerted to extend plunger 54 to the position shown in FIG. 7 upon the introduction of a power medium or fluid through port 86.

Whether the plunger 54 is extended or retracted, the seal member 82 remains disposed between the port 86 and passage 72, thereby isolating one from the other. It will be recognized, therefore, that fluid cannot pass from port 86 to passage 72 externally of plunger 54.

Extending from the inner or rearward end of plunger 54 are a series of three axially aligned and communicating bores of decreasing diameter. The rearward bore 88 is relatively large and terminates in a smaller intermediate bore 90 which in turn terminates in a tapered shoulder 92 and a small forward bore 94. The small forward bore 94 extends axially outwardly of seal member 82 and at the point intersects a cross bore 96 which extends diametrically through piston 54. Inwardly of seal member 82 a second cross bore 98 is provided diametrically through piston 54 in communication with bore 90. The combination of cross bores 96 and 98 and axial bores 90 and 94, therefore, provide what is best described as a bypass channel around seal member 82.

Obviously it is necessary to control the passage of pressure medium through the bypass to accomplish the above discussed sequential action of plungers 54 and 60. For this purpose there is provided a valve 100 terminating forwardly in a tapered seat sized to sealably engage the tapered shoulder 92 between bores 90 and 94. Valve 100 comprises a relatively long rod which extends inwardly of the inner end of plunger 54 slidably through a seal assembly 102.

Carried on rod valve 100 and slidable in bore 88 is a collar or retainer 104. Disposed between this collar 104 and the seal assembly 102 is a compression coil spring 106 which acts to bias valve 100 forwardly or outwardly of plunger 54 to engage its tapered end with shoulder 92 thereby closing the bypass channel. Such closure of the bypass is best shown in FIG. 6. Accordingly so long as the valve 100 remains seated on shoulder 92, pressure medium will be restrained from entering cylinder 44 and extending plunger 60.

Disposed in cylinder 42 rearwardly of port 86 is a stop collar 108. This collar is movable longitudinally in the cylinder, but normally prevented from shifting rearwardly by a cap member 110 and forwardly by a seal ring 112. Should it be desired to change the position of collar 108 for a purpose to be described hereafter, the cap member 110, which is threaded within cylinder 42, is rotated manually in the appropriate direction.

Carried on the outer end of valve rod 100 externally of seal assembly 102 is a relatively large washer 114 which defines a radial offset engageable with the outer end of collar 108 upon concomitant extension of the plunger 54 and valve rod 100 from the retracted position shown in FIG. 6 to the extended position of FIG. 7. Such engagement arrests movement of valve rod 100 whereby further forward movement of plunger 54 causes disengagement between valve 100 and tapered shoulder 92 as shown in somewhat exaggerated form in FIG. 7 for illustrative purposes. Fluid in cylinder 42 is thus free to flow through the bypass channel and passage 72 into cylinder 44 to extend plunger 60.

As will be apparent, the point of contact between washer 114 and collar 108 serves to define the extended position of plunger 54. Any movement of plunger 54 beyond that point will cause seat 92 to pull away from arrested valve 100, thereby opening the bypass for the flow of fluid therethrough. Obviously, so long as fluid is flowing through the bypass, plunger 54 will remain substantially stationary in cylinder 42, moving only slightly to adjust the opening between valve 100 and seat 92 in response to greater or lesser fluid pressure inwardly of seal member 82.

After plunger 60 has extended sufficiently to contact the ground under the vehicle 10 and raise the vehicle to the desired degree, delivery of fluid through port 86 will, of course, be discontinued manually by the operator of the vehicle. At that point, fluid pressure throughout the two cylinders is equalized, thus permitting plunger 54 to move slightly inwardly until seat 92 again contacts and seals against the end of valve 100. Such contact restricts any further movement of fluid through the bypass and any further inward movement of plunger 54. The extended position of plunger 54 accordingly is determined by the point of contact between seat 92 and valve 100. If the longitudinal position of stop collar 108 is changed as by rotation of cap 110 in the manner described previously, therefore, the extended position of plunger 54 can be correspondingly varied. This may be necessary, for example, to insure that the support assembly 40 is properly disposed in a vertical position relative to the vehicle 10 after the leveling device has been attached to the vehicle.

Assuming that the support assemblies 40 are in a vertical or lower operating position with the plungers 54 and 60 extended to support vehicle 10 as illustrated in FIG. 1, the parts of the cylinder-plunger assembly 42 – 54 will be disposed as illustrated in FIG. 7, except that the plunger 54 will have moved slightly inwardly for engagement between shoulder 92 and valve 100. This is the "at rest" extended position of the plunger 54. Assuming also that vehicle 10 is inadvertently moved in a forward direction without retraction of the support assemblies 40, the following sequence will occur to protect both the vehicle 10 and assemblies 40 against damage.

As a result of such inadvertent movement, pressure between plunger 54 and roller 58 will increase, with a corresponding increase in pressure on the fluid throughout the cylinders 42 and 44. At a pre-determined pressure level, fluid pressing against the tapered end of valve 100 in the bypass channel will cause the valve 100 to move inwardly relative to plunger 54 and collar 108 against the biasing action of spring 106. Such inward movement, of course, will open the bypass, thereby permitting fluid to move outwardly therethrough as the plunger 54 moves inwardly. As a result, the support assembly 40 (with plunger 60 still extended) will rotate on pivots 52 to the extent necessary to release excess pressure between plunger 54 and roller 58. Subsequently, springs 66 will retract plungers 54 and 60 and further rotate support assembly 40 to its usual storage position upon deactivation of the system and egress of fluid through port 86. In this connection, there is provided between the cylinders 42 and 44 a nipple 101 comprising a one way valve which by virtue of ball 103 will permit movement of fluid from cylinder 44 directly into cylinder 42 for egress through port 86 during retraction of the plunger 60.

The biasing action or force of spring 106 should be selected so that normal operating pressures in the cylinders 42 and 44 will not cause valve 100 to move away from shoulder 92. For example, if the normal operating pressure of the fluid system is in the range of 1,600 to 1,800 P.S.I., the spring should be selected to compress when the pressure on the valve face reaches 2000 P.S.I.

Figure 8:
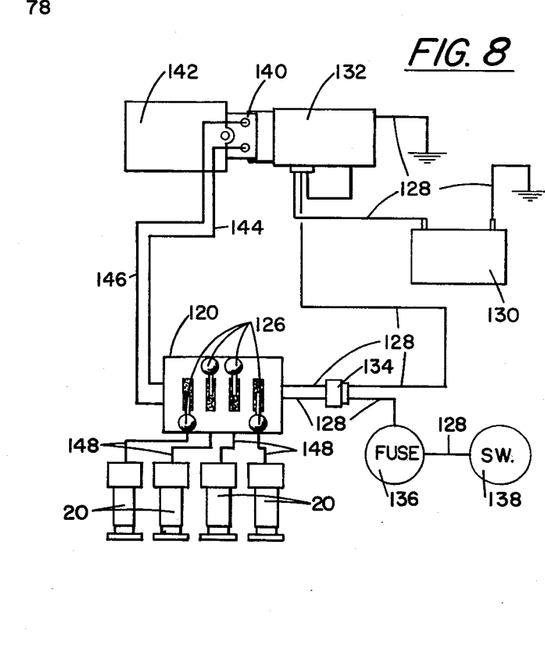
FIG. 8 is a diagrammatic view of the components of the leveling system according to the present invention.

The electrical and hydraulic components utilized in the preferred embodiment of the present invention are illustrated diagramatically in FIG. 8. It will be understood that the details of these components may be varied depending upon the type of vehicle involved and the arrangements found most convenient to the individual users. In the case of the illustrated system, however, the components hereof are arranged for use with a trailer as illustrated in FIG. 1, which is adapted to be pulled by a separate truck, automobile or similar vehicle.

Generally speaking, it is preferred that the central control assembly 120 be mounted in the cab of the separate truck or automobile in a location convenient to the driver. Within the control assembly 120 is a switch mechanism (not shown) which will "make" an electrical circuit between the battery 130 and hydraulic pump motor 132 to activate this motor upon initial movement of any of the individual control levers 126 from an intermediate "neutral" position. This circuit extends through suitable electrical wire 128 from battery 130 through the pump motor 132, connector 134, fuse 136 to the accessory terminal of the ignition switch 138 of the truck or automobile.

Operation of motor 132 will, of course, activate hydraulic pump 140 to draw fluid from reservoir 142 and deliver such fluid through conduit 144 to the central control 120. A return line 146 extends between the control 120 and pump 140 for purposes of returning fluid to the reservoir.

Included in central control 120 is a double acting fluid valve (not shown) associated with each of the individual control levers 126. Upon actuation of any one of these control valves in one direction, fluid from conduit 144 will be diverted into the feeder conduit 148 associated with the actuated valve. As will be understood, feeder conduits 148 are connected to ports 86 of the support assemblies 40 described heretofore as comprising components of the leveling devices. Thus, upon actuating one of the control valves in the one direction, the appropriate leveling device will be operated. Opening the valve in the other direction, of course, will permit return of fluid from the leveling device 20 through control 120 and return line 146 to permit deactivation of device 20 and its return to a storage position.

DESCRIPTION OF OPERATION

The operation of the system of the present embodiment and of the leveling devices used therein will now be described.

Assuming that vehicle 10 and an associated truck or automobile (not shown) have been parked on sloping or uneven terrain, and it is desired to level the vehicle 10 and support it against swaying while persons move about therein, the driver or operator should turn his ignition key to the accessory position. One of the control levers 126 of central control 120 should then be moved from a neutral position toward an operating position. Initially, this movement starts the pump motor 132, energy being supplied thereto through wires 128 from battery 130. Operation of motor 132 results in actuation of pump 140 for the delivery of fluid from reservoir 142 through conduit 144 to the central control 120.

Additional movement of the one control lever 126 will open an associated valve and divert fluid from conduit 144 into feeder conduit 148 for delivery to the support assembly 40 of the particular leveling device 20 selected for operation. Feeder conduit 148 is connected to port 86 of first cylinder 42 and fluid thus enters the first cylinder 42, engaging seal member 86 and moving piston 54 outwardly thereof.

The outer end of piston 54 reacts against and rotates around roller 58, which is fixed on the bracket 22 secured to the bottom of the vehicle 10. This reaction, in effect, pushes cylinder 42 away from the roller, causing cylinder 42 and the second cylinder 44 to rotate around pivot bolts 52 in bracket 22.

Piston 54 continues to extend outwardly relative to cylinder 42 until washer 114 engages stop collar 108. At that point, further movement of valve 100 is prevented although plunger 54 will move outwardly from that point an additional short distance. Such additional movement of plunger 54 unseats valve 100 from tapered shoulder 92, thereby opening a fluid passage which bypasses the seal member 82. Fluid is thus forced through the bypass and passage 72 into cylinder 44 for extension of the plunger 60 mounted therein.

During extension of plunger 54, the support assembly 40 is rotated from a relatively horizontal upper or storage position under vehicle 10 to a vertical operating position. The assembly remains in this position during extension of plunger 60. The extension of plunger 60, of course, is controlled by the operator through closure of the control valve of the central control 120 after plunger 60 has extended sufficiently to level and/or support the vehicle. The individual leveling devices 20 preferably are operated one at a time, starting with the one at the lowest corner of the trailer.

After all four leveling devices 20 have been extended as desired, the four individual control levers are returned to their neutral position, thus stopping motor 132 and discontinuing the delivery of fluid to the central control 120. The valves in this control, however, are maintained closed, thereby retaining fluid in the leveling devices 20 and holding them in their operating positions.

When it is desired to move the vehicle 10, it is merely necessary for the operator to move the control levers to a valve open position, which thus permits the return of fluid from leveling devices 20 through return line 146 in response to the retraction of plungers 60 and 54 as the support assembly 40 is pulled to its upper storage position by return springs 66.

Should the operator forget to retract the support assemblies 40 before moving the trailer, however, neither the vehicle or support devices 20 will be damaged by the pressure of plunger 54 against roller 58. This feature is provided by the resilient biasing of valve 100, which results in unseating of the valve 100 from shoulder 92 should pressure in the cylinders 42 and 44 approach a pre-determined excessive level. This is accomplished simply by fluid pressure against the tapered face of valve 100 through the bypass, such unseating allowing displacement of plunger 54 rearwardly in the cylinder 42 as fluid flows through the bypass. This displacement permits the support assembly to be pulled upwardly away from the ground even though the plunger 60 remains extended. Subsequently, of course, the operator of the vehicle can retract the plungers and return the support assembly to its fully retracted position simply by opening the valves associated with the control levers.

Although one embodiment of this invention has been described and illustrated with some particularity, it will be understood that such description and illustrations are illustrative only and are not to be taken as limiting the scope of the present invention as defined in the following claims.

I claim:

1. A device for use in a system of leveling a trailer, camper, truck or other similar vehicle relative to the terrain on which it is standing, said device comprising
   A. a support assembly mounted on the lower portion of said vehicle for rotative movement thereon between an upper storage position and a lower operating position, said support assembly providing
      i. a first power unit defining a first chamber from which a first plunger is axially extendable in one direction to rotate said assembly from its upper to its lower position and
      ii. a second power unit fixed relative to said first power unit and defining a second chamber from which a second plunger is axially extendable in another direction to engage said terrain after said assembly has been rotated to its lower position,
   B. means for sequentially extending said first plunger and then said second plunger, said extending means comprising
      i. a port opening into said first chamber,
      ii. a passage communicating between said first and second chambers,
      iii. means for isolating said port from said passage when said first plunger is retracted,
      iv. a power fluid,
      v. means for selectively delivering said power fluid into said first chamber through said port to move said first plunger from its retracted to its extended position,
      vi. means for bypassing said isolating means after extension of said first plunger, said bypass means diverting fluid from said first chamber through said first plunger and said passage and into said second chamber to move said second plunger from its retracted position to its extended position, and
   C. means for retracting said plungers and rotating said assembly to its upper position upon rendering said extending means ineffective.

2. A device according to claim 1, characterized by said isolating means comprising a seal member
   A. carried on said first plunger,
   B. slidingly and sealingly engaging said first chamber,
   C. forming a piston against which said fluid presses upon delivery thereof through said port, and
   D. being positioned between said port and said passage.

3. A device according to claim 2, characterized by said bypass means comprising
   A. a channel extending through said first plunger and communicating with said first chamber on opposite axial sides of said seal member,
   B. a valve biased into sealing engagement with and closing said channel, and
   C. means for disengaging said valve and said channel upon movement of said first plunger beyond its extended position.

4. A device according to claim 3, characterized by
   A. said first plunger having an axial bore extending from said channel inwardly through the inner end of said plunger,
   B. said valve comprising an elongate rod disposed in said bore for reciprocal movement both with and relative to said first plunger, C. means for resiliently biasing said rod axially of said bore into sealing engagement with said channel, and D. said disengaging means comprising
   i. a radial offset provided on said rod, and
   ii. a stop collar positioned within said first chamber for engagement with said offset to restrain said rod against movement with said first plunger beyond its extended position.

5. A device according to claim 4, characterized by said stop collar being axially movable within said first chamber to change the point of engagement between said offset and said stop collar.

6. A device according to claim 5, characterized by said retracting means comprising a resiliently expansible spring member continuously biasing said plungers toward their retracted positions and said support assembly toward its upper position.

7. A device according to claim 6, characterized by
   A. an hydraulic pump delivering fluid to said first chamber with sufficient pressure to extend said first plunger and thereby rotate said support assembly to its lower operating position in contravention to the biasing action of said retracting spring member,
   B. said radial offset engaging said stop collar upon movement of said first plunger to its extended position, and
   C. said valve being disengaged from said channel and opening said bypass for the flow of fluid therethrough and through said passage into said second chamber to extend said second plunger into engagement with said terrain.

8. A device according to claim 7, characterized by the feature that the degree of opening between said valve and said channel and the quantity of fluid passing therethrough are directly related to each other and to the amount of fluid pressure exceeding that necessary to maintain said first plunger extended in contravention to the biasing action of said retracting spring member.

9. A device according to claim 8, characterized by the feature that said first plunger automatically moves inwardly of said first chamber to move said valve into sealing engagement with said channel and close said bypass when the delivery of fluid into said first chamber is discontinued upon the desired extension of said second plunger into engagement with said terrain.

10. A device according to claim 9, characterized by the feature that excess pressure in said chambers acting through said bypass against said valve will unseat said valve and open said bypass to permit said first plunger to retract through said fluid in said first chamber and rotate said support assembly with said second plunger extended.

11. A device according to claim 10, characterized by a nipple extending between said chambers, said nipple defining a fluid passageway
   A. opening into said first chamber inwardly of said seal member, and
   B. including an insert operable as a one way valve to
      i. prevent movement of fluid through said nipple from said first chamber into said second chamber yet
      ii. permit movement of fluid through said nipple from said second chamber to said first chamber whereby fluid is rapidly expelled from said second chamber for movement through said first chamber and said port and conduit into said pump during retraction of said plungers.

12. A device according to claim 1, characterized by
   A. a mounting bracket disposed on the lower portion of said vehicle,
   B. means for pivoting said support assembly on said mounting bracket, and
   C. stop means provided by said bracket in the line of travel of said first plunger,
   D. said stop means limiting movement of the outer end of said first plunger relative to said pivot means whereby extension of said first plunger rotates said support assembly from its upper to its lower position.

13. A device according to claim 12, characterized by the feature that said stop means
   A. is disposed on said mounting bracket in a spaced relation with said pivot means, and
   B. includes a cylindrical surface of revolution disposed transversely of the longitudinal axis of said first plunger,
   C. said outer end of said first plunger reacting against and rotating around said cylindrical surface during said extension of said first plunger.

14. A device according to claim 13, characterized by a shaft extending axially through said stop means, said stop means being rotatable on said shaft in response to movement of said plunger end therearound.

15. A system for leveling a trailer, camper, truck or other similar vehicle relative to the terrain on which it is standing, said system comprising
   A. a plurality of leveling devices according to claim 1, and
   B. a manually operable valve assembly having a control for individually operating each said leveling device.

16. A leveling device comprising
   A. a mounting bracket having a pair of side plates disposed in a relatively parallel spaced relation,
   B. pivot means supported between said side plates,
   C. a support assembly mounted for rotative movement around said pivot means relative to said bracket between an upper storage position and a lower operating position,
   D. said support assembly comprising
      i. a first hydraulic cylinder having a first barrel portion and a first plunger mounted for relative reciprocal movement generally tangentially of said pivot means between retracted and extended positions,
      ii. a second hydraulic cylinder having a second barrel portion and a second plunger mounted for relative reciprocal movement generally radially of said pivot means between retracted and extended positions,
      iii. said first and second hydraulic cylinders being secured together with said plungers disposed in a spaced generally parallel relationship and positioned for movement in opposite directions,
   E. stop means mounted on said bracket and disposed in the line of travel of said first plunger,
   F. a fluid port extending into said first barrel portion,
   G. a fluid passage between said barrels,
   H. means for delivering fluid through said port into said first barrel to move said first plunger between its retracted and extended positions, the outer end of said first plunger reacting against and rotating around said stop means during its said movement to rotate said support assembly around said pivot means between its upper and lower positions, I. means responsive to extension of said first plunger for diverting fluid from said first barrel through said passage into said second barrel to move said second plunger between its retracted and extended positions sequentially after extension of said first plunger, and J. means for biasing said support assembly toward its upper position whereby said plungers are retracted and said support assembly is moved to its upper storage position upon rendering said fluid injecting means ineffective.

17. A leveling device according to claim 16, characterized by

A. a nipple between said barrels and comprising a one way valve through which fluid is returned from said second barrel to said first barrel during retraction of said plungers, and B. said biasing means comprising at least one coil spring connected at one end to said bracket above said pivot means and at the other end to the outer end of said second plunger.

18. A leveling device according to claim 17, characterized by

A. a seal member mounted on said first plunger for sliding movement within said first barrel, and B. means responsive to the build-up of excess pressure within said first barrel for permitting the movement of fluid past said seal member whereby said first plunger is movable to release said excess pressure.

19. A system for leveling a trailer, camper, truck or other similar vehicle, relative to the terrain on which it is standing, said system comprising A. a plurality of leveling devices mounted in a spaced relation with each other on the lower portion of said vehicle, each of said leveling devices comprising i. a mounting bracket secured to said vehicle, ii. a support assembly pivoted on said bracket for rotative movement relative to said vehicle between an upper generally horizontal position and a lower generally vertical position, iii. a first hydraulic cylinder provided by said support assembly and having a first plunger extendable to rotate said support assembly from said upper to said lower position, iv. a second hydraulic cylinder provided by said support assembly and having a second plunger extendable into engagement with said terrain, v. said first and second cylinders being connected in a parallel relationship with their plungers being extendable in opposite directions, vi. said first cylinder defining a fluid port for the ingress of fluid thereinto, vii. a fluid passage extending between the cylinders, and viii. means within said first cylinder for diverting fluid into said second cylinder after said first plunger is extended, B. an hydraulic pump mounted on said vehicle, C. a manually operable valve assembly having a control for individually operating each of said leveling devices, D. a conduit extending between said pump and said valve assembly and between each said valve control and the fluid port of each of said leveling devices, E. means for operating said pump for delivery of fluid to said valve assembly whereby one or more of said valve controls may be selectively operated to deliver fluid to the first cylinder of a selected support assembly, F. said first plunger being extended to rotate said selected support assembly from its upper to its lower position, G. said second plunger of said selected support assembly being extended into contact with said terrain following extension of said first plunger, and H. a resilient member connected between each said bracket and each said second plunger and biasing said first and second plungers into their retracted positions and said support assemblies into their upper horizontal position upon rendering said pump ineffective and opening said valve controls.

* * * * *